(12) United States Patent
Dreixler et al.

(10) Patent No.: US 10,788,101 B2
(45) Date of Patent: Sep. 29, 2020

(54) LINK WITH SWIVEL BALL BUSHING ROTATABLE IN OPPOSING DIRECTIONS

(71) Applicant: Columbia Steel Casting Co., Inc., Portland, OR (US)

(72) Inventors: Charles Dreixler, Canby, OR (US); David Garnet John Conroy, Queensland (AU); Jesse Fritz, Portland, OR (US)

(73) Assignee: Columbia Steel Casting Co., Inc., Portland, OR (US)

( * ) Notice: Subject to any disclaimer, the term of this patent is extended or adjusted under 35 U.S.C. 154(b) by 238 days.

(21) Appl. No.: 15/873,871

(22) Filed: Jan. 17, 2018

(65) Prior Publication Data

US 2019/0219136 A1 Jul. 18, 2019

(51) Int. Cl.
| | |
|---|---|
| *F16G 15/08* | (2006.01) |
| *F16G 15/12* | (2006.01) |
| *F16G 13/12* | (2006.01) |
| *F16C 11/06* | (2006.01) |
| *E02F 3/48* | (2006.01) |

(52) U.S. Cl.
CPC ............... *F16G 15/08* (2013.01); *E02F 3/48* (2013.01); *F16C 11/06* (2013.01); *F16G 13/12* (2013.01); *F16G 15/12* (2013.01); *F16C 11/0614* (2013.01); *F16C 2361/71* (2013.01)

(58) Field of Classification Search
CPC .......... F16G 15/08; F16G 15/12; F16G 13/18; F16G 13/10; F16G 13/12; E02F 3/58
USPC ............................................................ 59/95
See application file for complete search history.

(56) References Cited

U.S. PATENT DOCUMENTS

| | | | |
|---|---|---|---|
| 9,482,315 B1 * | 11/2016 | Dreixler | E02F 3/58 |
| 2013/0133175 A1 * | 5/2013 | Doan | E02F 3/58 |
| | | | 29/525.01 |
| 2019/0219136 A1 * | 7/2019 | Dreixler | F16G 15/08 |

* cited by examiner

*Primary Examiner* — Teresa M Ekiert
(74) *Attorney, Agent, or Firm* — Klarquist Sparkman, LLP

(57) ABSTRACT

An end link for use with heavy equipment includes a body and a swivel ball bushing. The body has first and second openings and defines a main body plane. The first opening has a slot located on a side thereof proximate the second opening and a truncated substantially spherical inner surface. The swivel ball bushing is seated within the first opening. The swivel ball bushing has a truncated substantially spherical outer surface in nesting engagement with the inner surface of the body and a projection at one end seated in the slot. The projection and slot are shaped to allow rotation of the swivel ball bushing relative to the body in two opposing directions about one axis of rotation or two mutually perpendicular axes of rotation.

19 Claims, 16 Drawing Sheets

LINK WITH SWIVEL BALL BUSHING ROTATABLE IN OPPOSING DIRECTIONS

The present application pertains to chains, chain links and other similar components for use with heavy equipment.

BACKGROUND

Heavy equipment applications make use of chains which have very large load hoisting, or lifting, capabilities. One such field of use for heavy lifting chains is in draglines which are commonly used for removing large volumes of material, such as dirt, loosened ore, etc. Draglines work by dragging a large bucket along a surface to scoop up material and are available in a variety of sizes.

The loads experienced by hoist and drag chains and their respective links are massive. These loads require the use of specialized chain links made from high strength alloy steels. In addition, these chains and chain links must be designed to endure a tremendous amount of wear. For example, one common failure point for links having a conventional bushing fitted by welding at the coupling point to provide a wear surface due to wear caused by adjacent links is the weld. The structure and operation of a typical dragline requiring such massive and high load carrying chains and links is described in U.S. Pat. No. 6,170,248, which is incorporated herein by reference.

Commonly assigned U.S. Pat. No. 9,482,315, which is incorporated by reference herein, describes end links with swivel ball bushings configured to tilt out of plane to provide greater resistance to wear, especially when withstanding off-axis loads, which significantly advanced the state of the art. It would be advantageous to make end links and other similar components even more resistant to wear, more adaptable to multiple uses and easier to use and repair. It would also be advantageous to make end links and swivel ball bushing arrangements capable of movement through greater angular ranges.

SUMMARY

Described below are implementations of a new end link and swivel ball bushing arrangement for use with heavy equipment.

According to one implementation, an end link for use with heavy equipment includes body and a swivel ball bushing. The body has first and second openings and defines a main body plane. The first opening has a slot located on a side thereof proximate the second opening and a truncated substantially spherical inner surface. The swivel ball bushing is seated within the first opening. The swivel ball bushing has a truncated substantially spherical outer surface in nesting engagement with the inner surface of the body and a projection at one end seated in the slot. The projection and slot are shaped to allow rotation of the swivel ball bushing relative to the body in two opposing directions about one axis of rotation or two mutually perpendicular axes of rotation.

In some implementations, the projection and slot are shaped to allow rotation of the swivel ball bushing about exactly two mutually perpendicular axes of rotation. In some implementations, the projection and slot are shaped to allow rotation of the swivel ball bushing about exactly one axis of rotation.

The body of the end link can have a longitudinal axis extending through the body and the first opening, a lateral axis perpendicular to the longitudinal axis and extending laterally through the body and the first opening, and a perpendicular axis perpendicular to a plane defined by the longitudinal axis and lateral axis. The engagement between the projection and the slot can prevent relative rotation between the body and the swivel ball bushing about the perpendicular axis.

In some implementations, the swivel ball bushing is free to rotate (or pivot, swivel or tilt) in two opposing directions about the lateral axis through a range of 0 to 5 degrees, 0 to 10 degrees, 0 to 15 degrees, or even 0 to 30 degrees, in each of the opposing directions out of alignment with the body, depending upon the clearance available between the mating parts (including any pin received in the swivel ball bushing), as well as other possible factors.

The swivel ball bushing can have a thickness and the slot can have a width dimension greater than the thickness such that the swivel ball bushing may be oriented perpendicularly to the first opening and inserted into the first opening and slot.

The projection can have a modified cylinder shape with an opposing pair of curved surfaces defining a diameter of the cylinder shape separated by an opposing pair of reduced dimension surfaces having a reduced dimension less than the diameter. The narrowest dimension of the slot can be greater than the reduced dimension and less than the diameter.

The swivel ball bushing can have a first wall thickness away from the projection and a second wall thickness proximate to the projection, the first wall thickness being greater than the second wall thickness. The wall thickness of the swivel ball bushing can taper as the outer surface transitions from the first wall thickness to the second wall thickness.

The swivel ball bushing can be substantially symmetric relative to the longitudinal center axis and the lateral axis. The slot and projection can be substantially symmetric relative to the longitudinal axis and the lateral axis.

The slot and projection can each have mating truncated substantially spherical surfaces to allow relative pivoting movement therebetween about the longitudinal center axis in the two opposing directions and about the lateral axis in the two opposing directions but not about the perpendicular axis.

In some implementations, the swivel ball bushing and main body can be free to pivot relative to each other through a range of 0 to up to 15 degrees in each of the opposing directions about the lateral axis and 0 to at least 90 degrees in each of the opposing directions about the longitudinal axis.

The end link can have a cylindrical bore sized to receive a pin.

The projection can have an end surface that is symmetrically curved in two directions.

According to another implementation, a swivel ball bushing arrangement for use with rigging components for heavy equipment comprises a race and a swivel ball bushing. The race has an opening, a slot in the opening, an inner mating surface and an outer surface configured for coupling within an opening of a rigging component. The swivel ball bushing can be seated within the opening of the race. The swivel ball bushing has a truncated substantially spherical outer surface in nesting engagement with the inner surface of the race and a projection at one end seated in the slot. The projection and the slot are shaped to allow rotation of the swivel ball bushing relative to the body about one axis of rotation or two mutually perpendicular axes of rotation.

The outer surface of the race can be cylindrical. The outer surface of the race can be coupled within the opening of the rigging component at a selected orientation such that the swivel ball bushing is free to tilt in opposite directions about an axis of rotation relative to the race and the rigging component.

The foregoing and other features and advantages will become more apparent from the following detailed description, which proceeds with reference to the accompanying figures.

DETAILED DESCRIPTION

Figure 1:
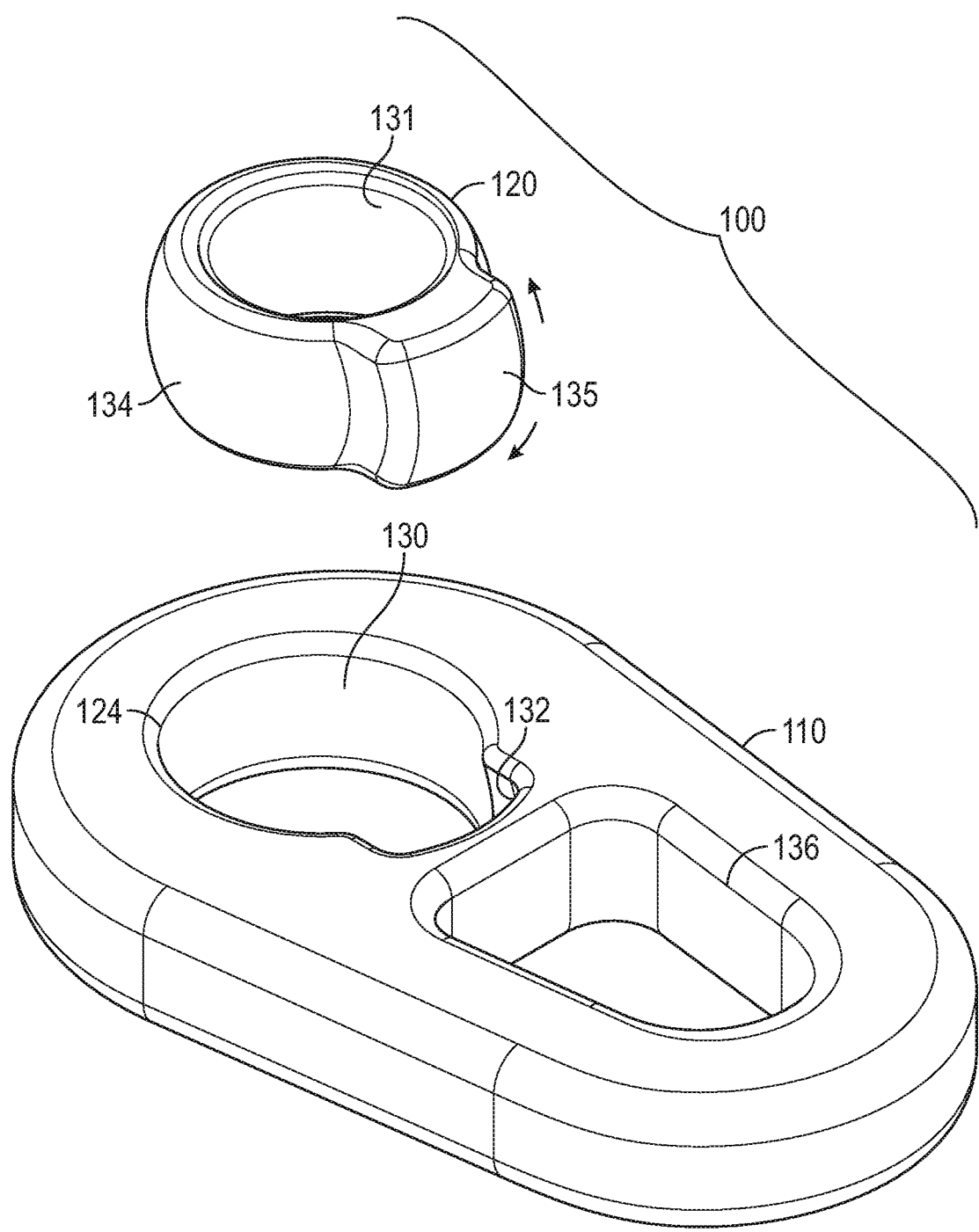
FIG. 1 is an exploded perspective view of an end link with a swivel ball bushing rotatable about both directions of an axis (i.e., in a first plane).
Figure 2:
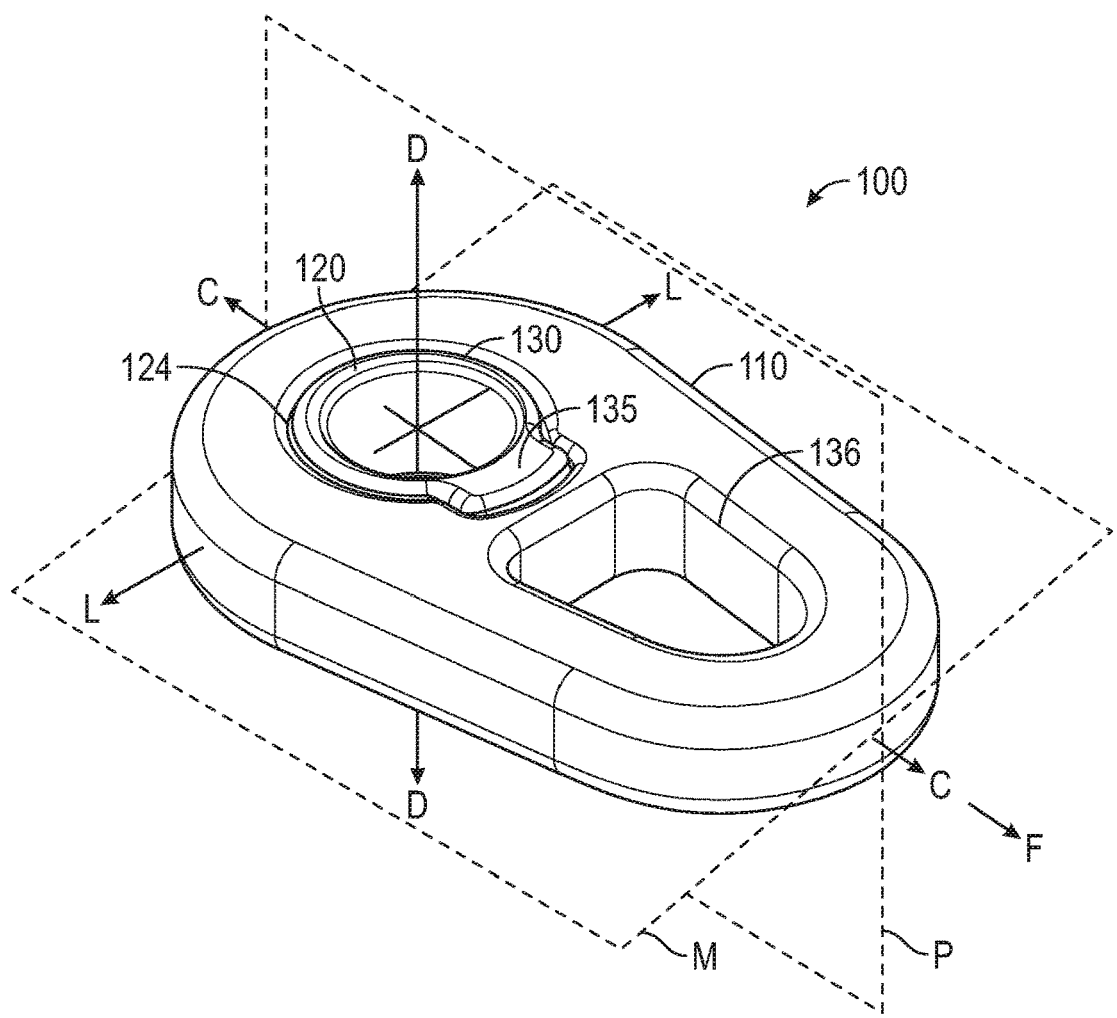
FIG. 2 is a perspective of the link of FIG. 1 showing the swivel ball bushing installed in the link body.

Referring to FIGS. 1 and 2, a new end link 100 (also referred to as a link or a stud end link) according to a first implementation has a main body 110, with one end having a swivel ball mating surface 130 and a swivel ball bushing (or swivel ball) 120 shaped to be received in a space or opening 124 defined by the swivel ball mating surface 130, and the other end having a link opening (or pass-through opening) 136 located at the other end of the main body 110. Unlike prior swivel ball end links, the swivel ball bushing 120 is swivelable or rotatable relative to the main body 110 in both directions (i.e., two opposing directions) of rotation, yet the rotation is limited or constrained to one axis of rotation or two axes of rotation that are mutually perpendicular to each other (i.e., rotation constrained to one or two planes). Thus, the swivel ball bushing 120 is constrained against entirely free rotation about all three possible axes of rotation.

The main body 110 preferably has a generally oblong-like shape, with rounded corners and mildly tapering sides, but other shapes compatible with chain links or end links are suitable as well.

The swivel ball bushing 120 includes a pin bore 131 adapted to receive a matingly sized pin (see FIG. 22) or other cylindrical through-member, and a truncated substantially spherical swivel ball outer surface (or wall) 134. The inner surface of the pin bore 131 can be substantially cylindrical.

Figure 6:
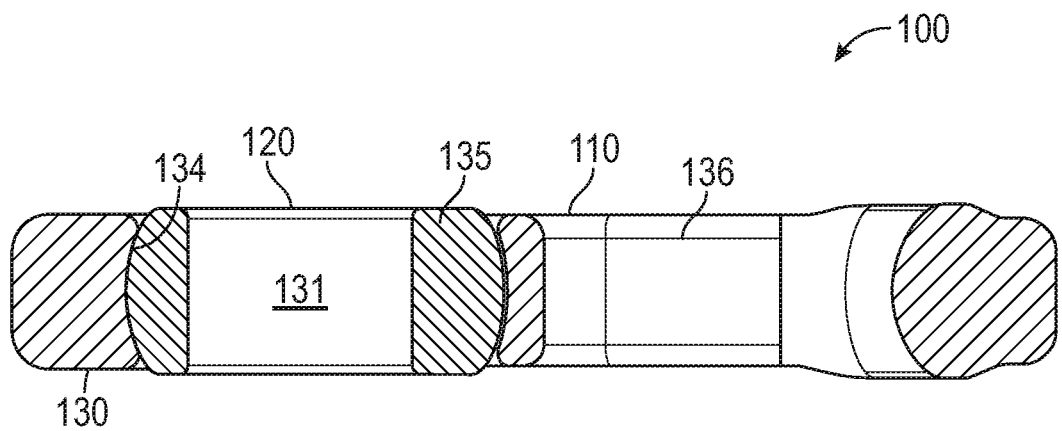
FIG. 6 is a longitudinal cross section view of the link of FIG. 1 in elevation, with the swivel ball bushing installed.

As also shown in the section view of FIG. 6, the radius of the substantially spherical swivel ball outer surface 134 generally corresponds to the radius of the swivel ball mating surface 130 to provide a compatible fit. In reference to swivel ball outer surface 134 and swivel ball mating surface 130, the term "truncated substantially spherical surface" is meant to refer to a surface that is generally curvilinear in two directions and generally corresponds to a partial surface portion of a sphere (such as a surface portion comprising a 360 degree band around an equator of the sphere, similar to a spherical segment defined between two planes).

Figure 3:
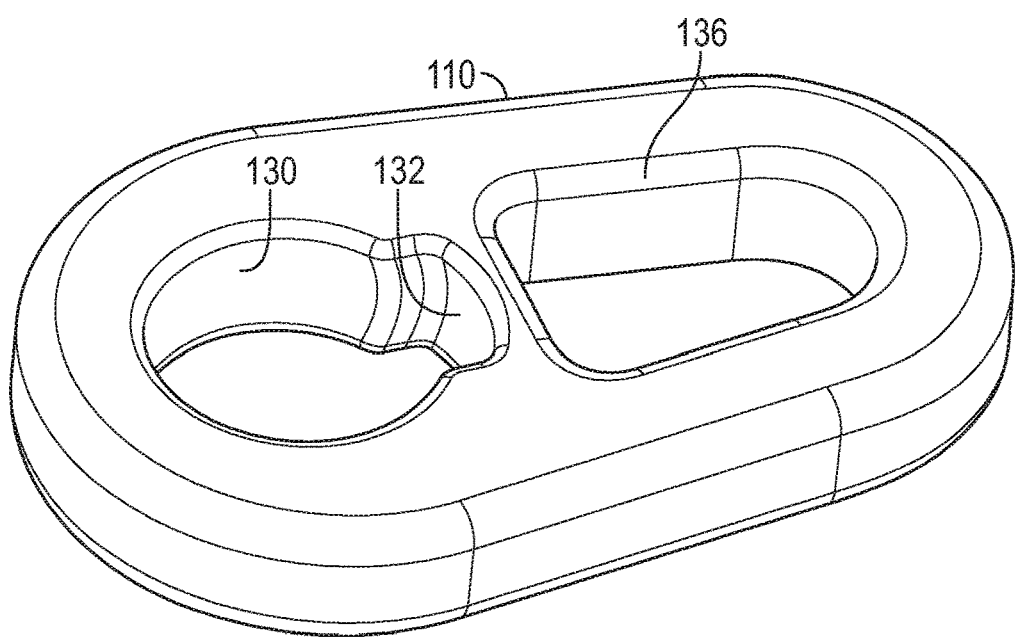
FIG. 3 is a perspective view of the link of FIG. 1 with the swivel ball bushing removed.
Figure 7:
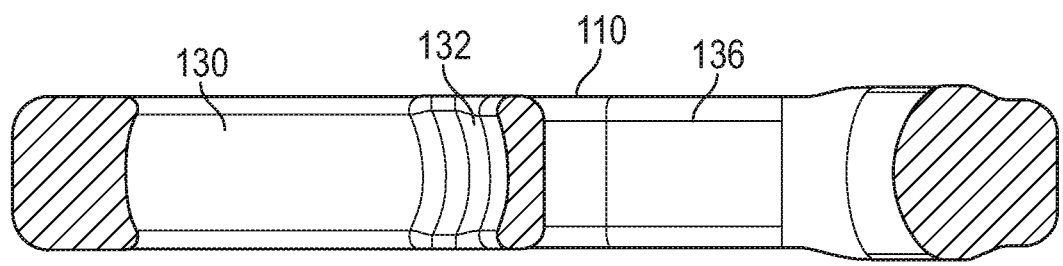
FIG. 7 is a longitudinal cross section view of the link in elevation similar to FIG. 6, except with the swivel ball bushing removed.
Figure 8:
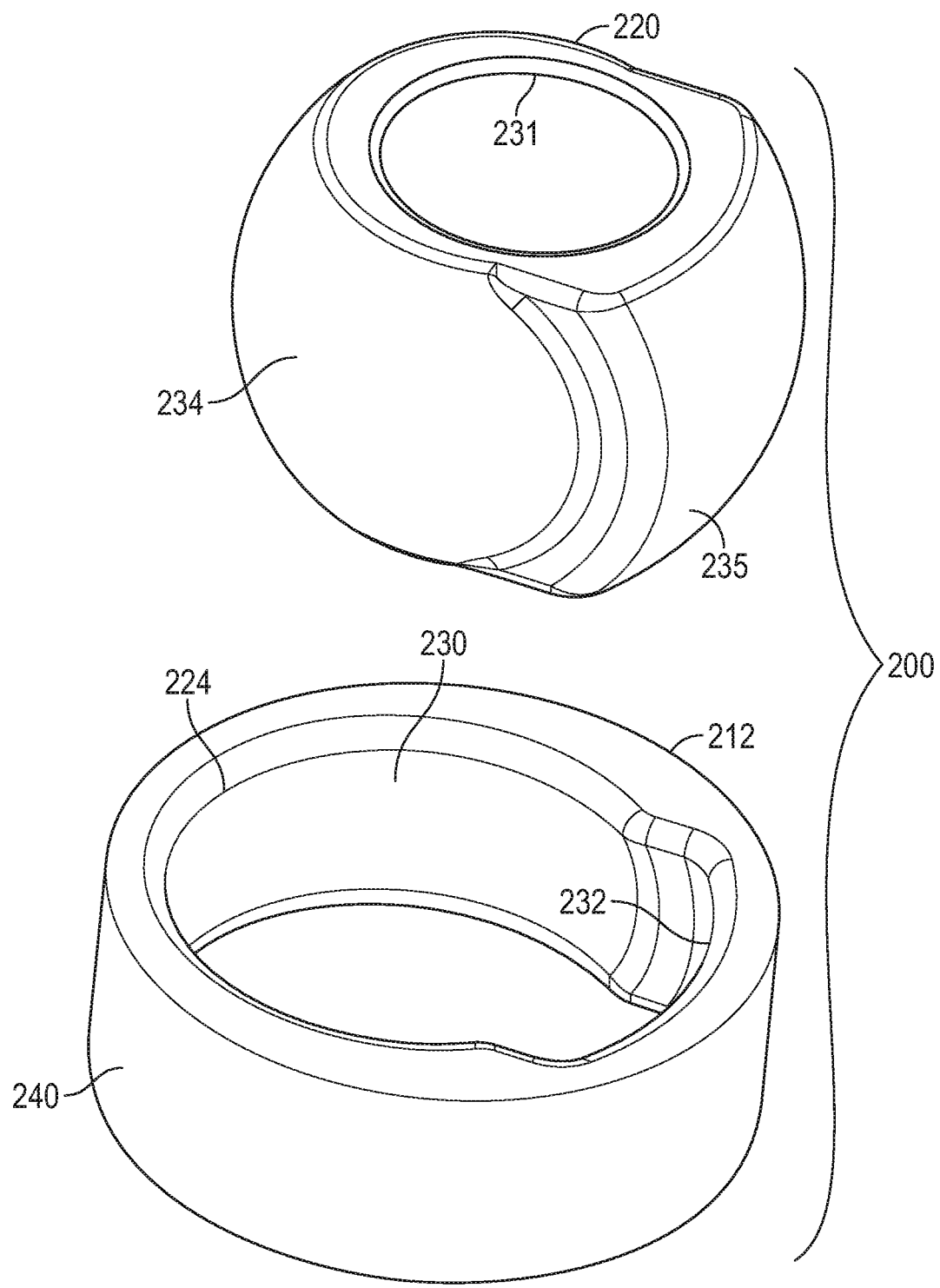
FIG. 8 is an exploded perspective view of a swivel ball bushing and swivel ball race according to another implementation.
Figure 9:
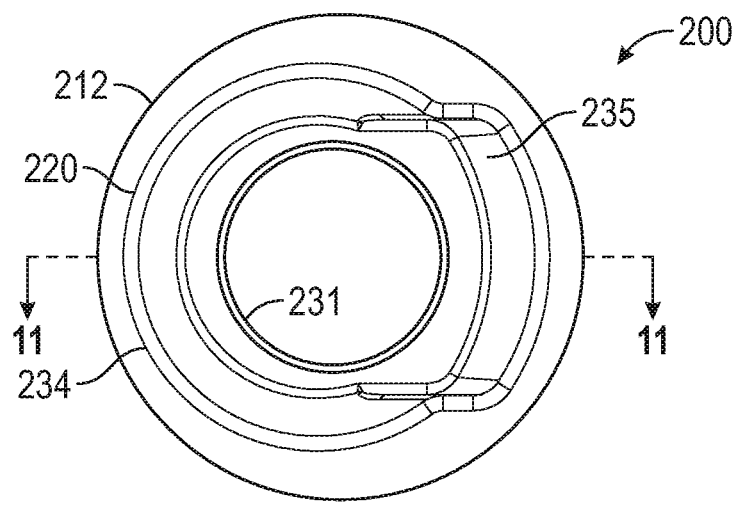
FIG. 9 is a top plan view of the swivel ball bushing and swivel ball race.
Figure 10:
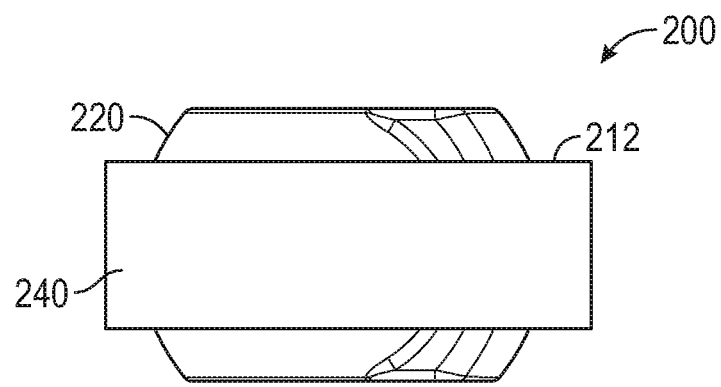
FIG. 10 is a side elevation view of the swivel ball bushing and swivel ball race of FIG. 9.
Figure 11:
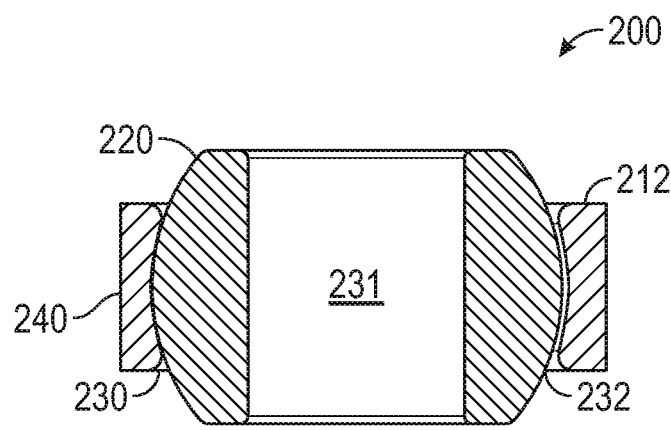
FIG. 11 is a longitudinal cross section view of the swivel ball bushing and swivel ball race of FIG. 9 in elevation.

At one end of the swivel ball mating surface 130, a channel or slot 132 is formed in the main body 110, such as proximate to both a central region of the main body 110 and one end of the link opening 136. The width of the slot 132 is at least slightly greater than a thickness of the swivel ball bushing 120. Additional details of the slot 132 can be seen in FIGS. 3-5 and the section view of FIG. 7. A projection 135 on the swivel ball bushing 120 is shaped to fit within the slot 132. As is described below in greater detail, engagement between the projection 135 and the slot 132 prevents rotation about the perpendicular axis (i.e., the axis D shown in FIG. 2 and described below).

The link opening 136 preferably is an elongated opening with tapering sides corresponding to the tapering sides of the main body 110. The link opening 136 serves to receive and capture an adjacent chain link or other object.

The end link 100 (and main body 110) can be described with respect to a coordinate axis system. Although the end link 100 (and main body 110) can have many shapes, forms and proportions, it preferably is longer than it is wide and has a thickness that is less than its length and width. Due to its preferably quasi-flat profile, the main body 110 can be said to define a main body plane M extending therethrough that bisects the main body into upper and lower halves as shown schematically in FIG. 2. The main body plane M is co-planar with the main body. A longitudinal center axis C lying in the plane M extends the length of the link 100. A second plane P is defined to extend perpendicular to the main plan M at the center axis C. The second plane P bisects the main body 110 into two preferably generally symmetric or mirror image lateral halves. Similarly, the second plane P also bisects the openings 124, 136, preferably into two symmetric halves.

A lateral axis L extends perpendicular to the center axis C, lies in the plane M and passes through the geometric center of the circular portion of the opening 124 defined by the swivel ball mating surface 130. A perpendicular axis D lies in the plane P, passes perpendicularly through the plane M, and intersects with the center axis C and lateral axis L to define a 3-axis coordinate system whose center is at the geometric center of the circular portion of the opening 124.

Figure 4:
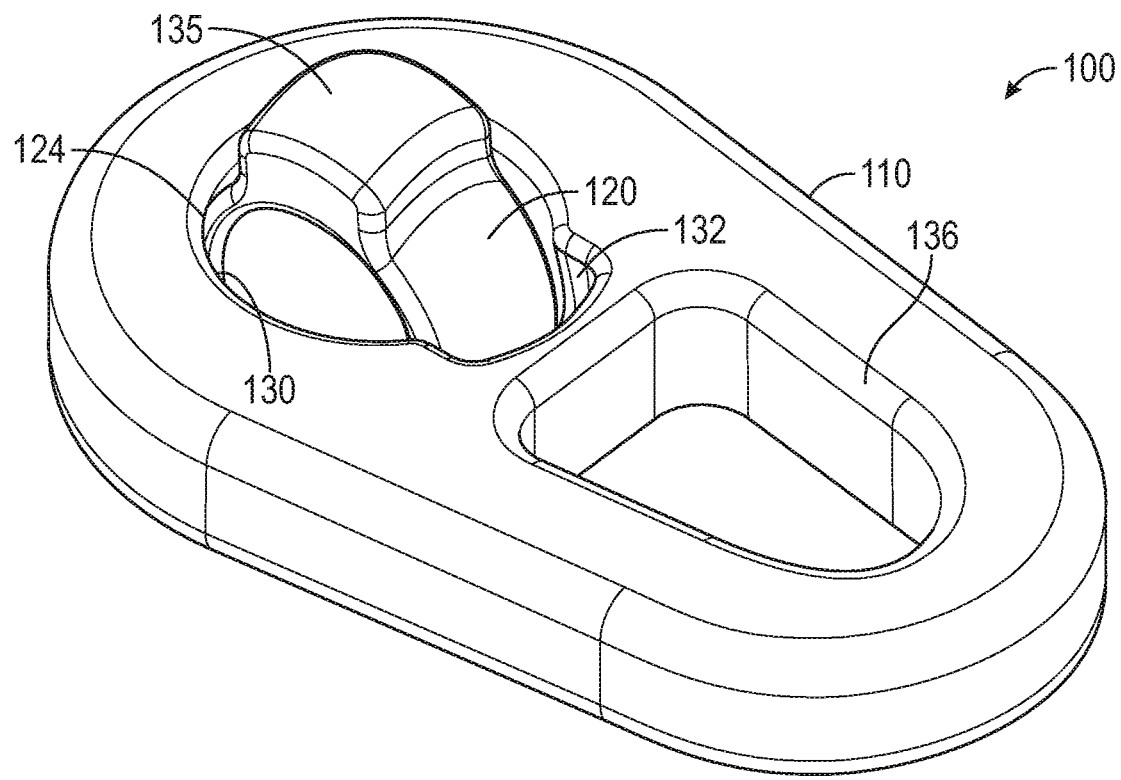
FIG. 4 is another perspective view of link of FIG. 1 showing the swivel ball bushing being installed.
Figure 5:
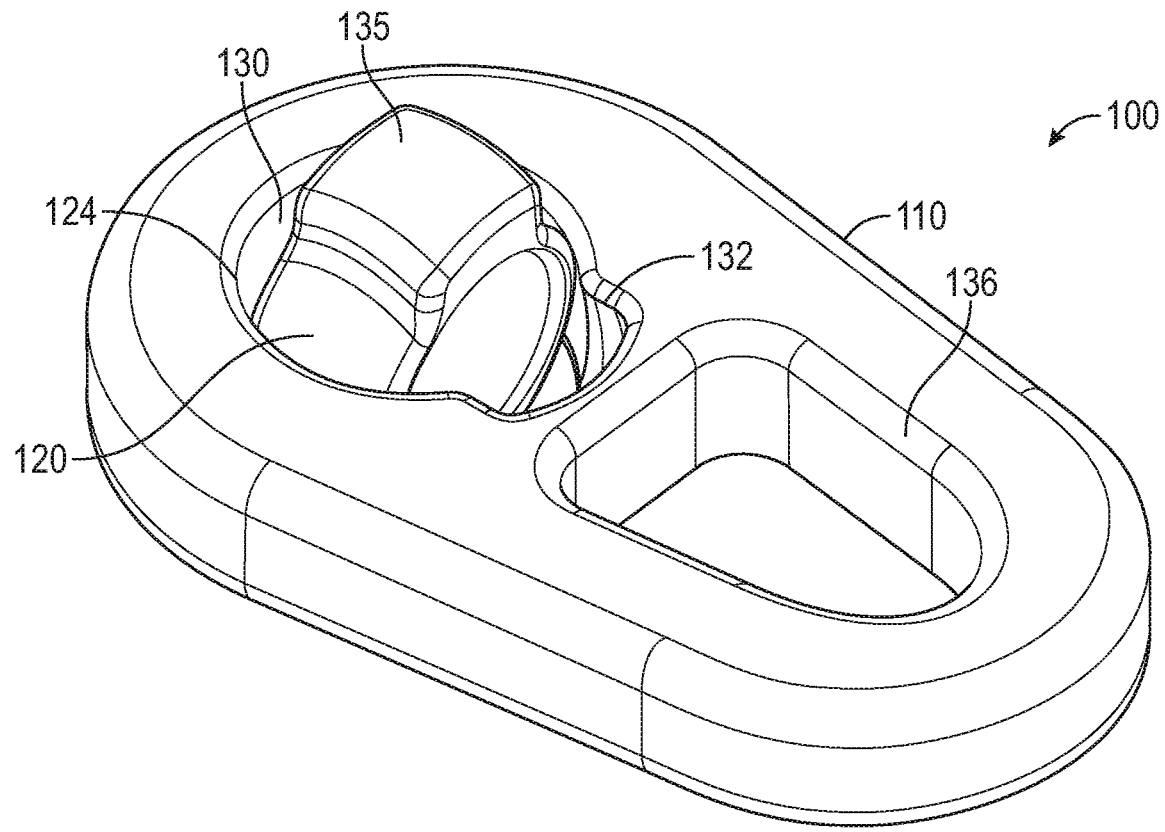
FIG. 5 is another perspective view of the link of FIG. 1 with the swivel ball bushing installed and rotated.

Turning to FIG. 4, the swivel ball bushing 120 is installed in the link by aligning it at a 90 degree (sideways) orientation to the main body 110, i.e., in the plane P, inserting it in the direction of axis D into the opening 124 and slot 132, moving it away from the slot 132 in the direction of axis C and into contact with the mating surface 130 as shown in FIG. 4. From the position shown in FIG. 4, the swivel ball bushing 120 can be rotated about the axis D until the projection 135 is aligned with the slot 132 as shown in FIG. 5. The swivel ball bushing 120 can then be rotated about the axis L until the projection 135 is received in the slot 132, as shown in FIG. 2.

In FIG. 2, the swivel ball bushing 120 is fully rotated and seated within the mating surface 130. As such, the swivel ball bushing outer surface 134 and mating surface 130 are in mating or nesting contact with each other. Over the course of installing the swivel ball bushing 120, a center axis of pin bore 131 is rotated 90 degrees from a position substantially co-planar with the plane M (and substantially parallel to the lateral axis L) to a position perpendicular to the plane M (and at least largely coextensive with the axis D).

Due to the geometry of the truncated spherical engaging surfaces, the swivel ball bushing 120 is captured by the main body 110 and largely restrained from moving relative to the main body 110, either longitudinally, laterally or perpendicularly, except to the limited extent described below. The swivel ball bushing 120 is captured in place (and yet selectively movable as described below) without any welding.

In operation, the end link 100 is subject to large forces acting primarily in the direction of the longitudinal axis C of the main body 110. The mating surface 130 of the main body 110 provides a wall surface to support the lateral sides of the swivel ball bushing 120 and, because the mating surface engages it largely on all sides, also supports its longitudinal sides. The swivel ball bushing 120 as a whole also is prevented from being displaced perpendicularly (except in the pivoting manner described below). In other words, the swivel ball bushing 120 is constrained from translation movement in the longitudinal, lateral and perpendicular directions during use. (Any displacement perpendicularly "out of plane" is through pivoting movement.)

Yet, the spherical surface interengagement of the swivel ball bushing 120 and mating surface 130 allows the main body 110 to tilt or pivot a limited amount "out of plane" M relative to the swivel ball bushing 120 in either direction of axis D as, for example, up to 10 degrees off-axis (including up to about 5 degrees off-axis) to accommodate off-axis loads. Depending on perspective, it also can be said that the swivel ball bushing 120 is free to swing or tilt "out of plane" in either direction relative to the main body 110 up to 10 degrees off-axis (including up to about 5 degrees off-axis) to accommodate off-axis loads. Stated differently, the swivel ball bushing in some implementations can have a selected range for pivoting, rotating, tilting or swinging of up to ±10 degrees, for a total range of up to 20 degrees.

A tilting displacement occurs when the swivel ball bushing 120 pivots about the lateral axis L (which laterally bisects the swivel ball pin bore 131) such that a distal end of the swivel ball pivots out of plane in one direction and the other proximal end (near the slot) pivots out of plane in the other direction.

Providing for rotation in each of the opposing directions about an axis of rotation is advantageous in case an expected direction of loading changes from one side of the axis to the other side of the axis. If a link is capable of pivoting in only one direction relative to the axis and the loading changes, then the rigging may need to be disassembled such that the link can be reinstalled in a reverse orientation to accommodate the changed direction of loading, which can requiring handling of heavy components and substantial downtime.

If the swivel ball bushing 120 becomes worn or otherwise needs to be replaced, it can be easily removed from the end link by rotating the swivel ball bushing 90 degrees about the lateral axis L (so that the projection 135 is disengaged from the slot 135 as shown in FIG. 5), rotating it about the axis and shifting it in the direction C towards the slot 132 (as shown in FIG. 4), and moving it in the direction D perpendicular to the plane M, thereby reversing the installation process.

The projection 135 aligns with the slot 132 and can be bisected by the longitudinal axis C. The projection 135 preferably is symmetric relative to the longitudinal axis C, as well as the lateral axis L, i.e., the projection is symmetric relative to both the planes M and P. In this way, the swivel ball bushing 120 can rotate or tilt out of plane in the two opposite directions relative to the main body 110, about the axis L. The outer surface of the projection 135 is curvilinear in two directions to form a truncated substantially spherical surface. Similarly, the slot 132 presents a reverse mirror image, and has a truncated substantially spherical surface that mates or nests with the projection 135.

The mating truncated spherical geometries of the projection 135 and slot 132, as well as the mating geometries of the rest of the swivel ball bushing's outer surface 134 and mating surface 130, allow the swivel ball to tilt or pivot relative to the main body out of the plane M. Yet, when the swivel ball bushing 120 is installed for use, it is constrained by the projection 135 from rotating or spinning within the mating surface 124 (i.e., within the plane M).

Within the plane M of the main body, the installed swivel ball bushing 120 is constrained from translation movement both longitudinally and laterally, and from spinning or rotating about the axis D passing through the center of the pin bore 131. The swivel ball bushing 120, however, can tilt or pivot a selected amount about the lateral axis L passing through the midpoint of the pin bore 131, as described above. And the swivel ball bushing 120 can pivot or rotate at least 90 degrees about a longitudinal axis passing through the center of the swivel ball (as well as the tab) to facilitate installation and removal of the swivel ball.

The swivel ball bushing 120 can be configured to be slightly eccentric. As best seen in FIG. 1, the wall thickness of the swivel ball bushing 120 at the distal end opposite the projection 135 is thicker, and this wall thickness tapers approaching the projection 135. In other words, the wall thickness of the swivel ball bushing 120 is thinnest in the areas on either side of the projection 135 and thickest at the opposite distal, longitudinally-opposed end.

Explained in a different way (and ignoring the projection 135 for illustration), the additional material on the distal end of the swivel ball bushing 120 is created by shifting the swivel ball bushing pin bore 131 a certain distance, preferably about ¼ inch to ¾ inch, in the direction of the slot 132, such that the swivel ball bushing 120 is slightly eccentric. In other words, the center axis defined by the pin bore 131 (i.e., axis D in the installed position) is displaced about ¼ inch to ¾ inch relative to the center axis of the outer surface. The pin bore 131 and outer surface thus have respective center axes that are displaced and not coincident.

Most of the force exerted during use of the end link is applied in the pull direction of arrow F shown in FIG. 2, and results in substantial loading and maximum wear on the longitudinal distal side of the swivel ball bushing 120. The eccentric swivel ball bushing, with additional material on the high wear side of the swivel ball, facilitates additional service life during operation.

FIGS. 8-11 illustrate another implementation of a swivel ball bushing arrangement 200 in which a swivel ball bushing 220 is provided with a race 212 that receives the swivel ball bushing 220 and can be fitted to a cylindrical opening, such as in a link or other dragline rigging component. The elements of the swivel ball bushing arrangement 200 corresponding to elements of the implementation of FIGS. 1-7 are numbered with the same number plus 100.

Thus, the swivel ball bushing 220 corresponds to the swivel ball bushing 120, and can have the same configuration with a pin bore 231, an outer surface 234 and a projection 235. The race 212 that receives the swivel ball bushing 220 has an opening 224, a mating surface 230 and a slot 232 sized to receive the projection 235, similar to the body 110. The race 212 has an outer surface 240, such as a cylindrical surface as shown, that can be coupled to another component, such as a link or other component, to provide the component with the swivel ball bushing advantages described above, particularly to accommodate out-of-plane pulling forces and the accompanying wear.

The outer surface 240 is sized and shaped for coupling to another component. For example, the outer surface 240 may be welded within an opening of another component to join the swivel ball bushing arrangement 200 to the other component. The race 212 would typically be aligned to position the slot 232 (and the projection 235 received therein) along the longitudinal axis, but other orientations are also possible, which may provide advantages in some applications.

With the swivel ball bushing arrangement 200, swivel ball bushing advantages can be provided without the accompanying costs of replacing an entire component, such as the link 100. Also, if wear occurs, then the worn race 212 can be removed and a new race (and optionally, a new swivel ball bushing 220) can be installed in its place without requiring replacement of the entire component. In some implementations, it may be possible to retrofit components that do not originally have a swivel ball bushing with the swivel ball bushing arrangement 200.

FIGS. 12-19 illustrate another implementation of an end link 300 that is similar to the end link 100 described above, but provides for rotation, swiveling, tilting or pivoting movement out-of-plane in two opposite directions for each of two planes that are perpendicular to each other. In the end link 300, elements corresponding to elements of FIGS. 1-7 are labeled with the same reference number plus 200.

Referring to FIGS. 12-19, the end link 300 is configured similar to the end link 100, except that the projection 335 of the swivel ball bushing 320 and the slot 332 of the body 310 are shaped to allow the swivel ball bushing 320 to be rotated in two mutually perpendicular planes, instead of the single plane rotation provided for with the end link 100. Referring to the same coordinate reference system used in FIG. 2, the swivel ball bushing 320 can rotate relative to the main plane M about the lateral axis L in both directions (similar to the swivel ball bushing 120), but can additionally rotate relative to the plane P about the longitudinal axis C in both directions. Thus, the swivel ball bushing 320 can be described as being capable of rotation in four directions.

Figure 12:
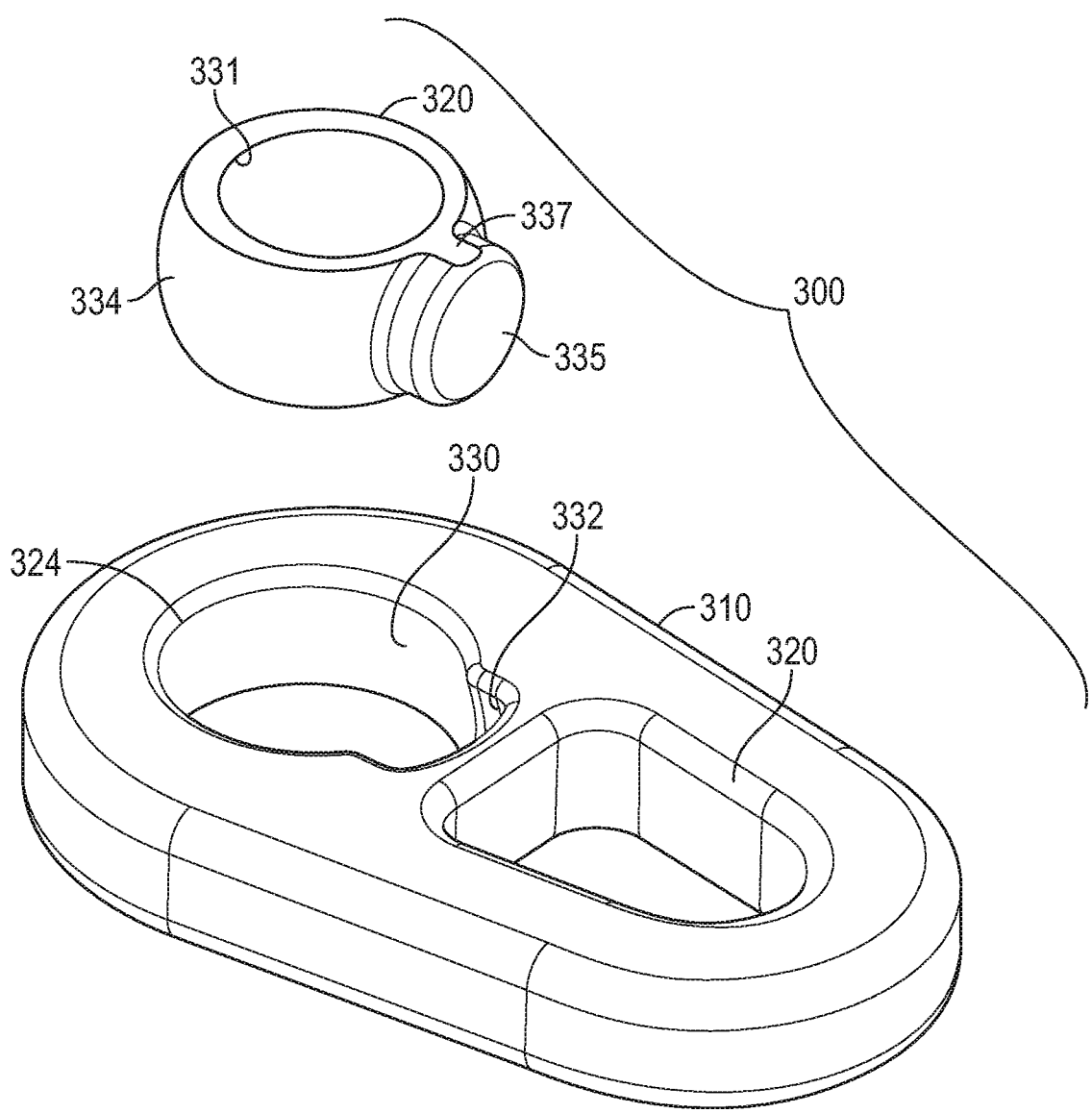
FIG. 12 is an exploded perspective view of an end link with a swivel ball bushing rotatable in both directions about first and second axes of rotation that are perpendicular to each other (i.e., rotation in two perpendicular planes).
Figure 13:
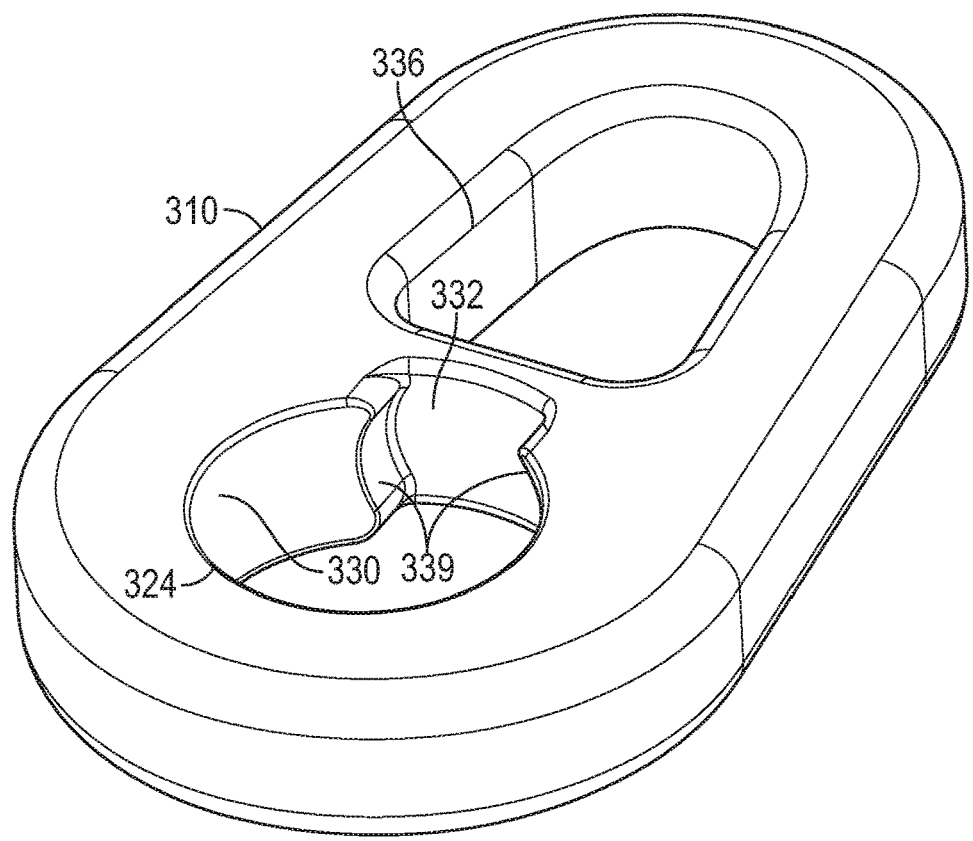
FIG. 13 is a perspective view of the link of FIG. 12 with the swivel ball bushing removed.
Figure 18:
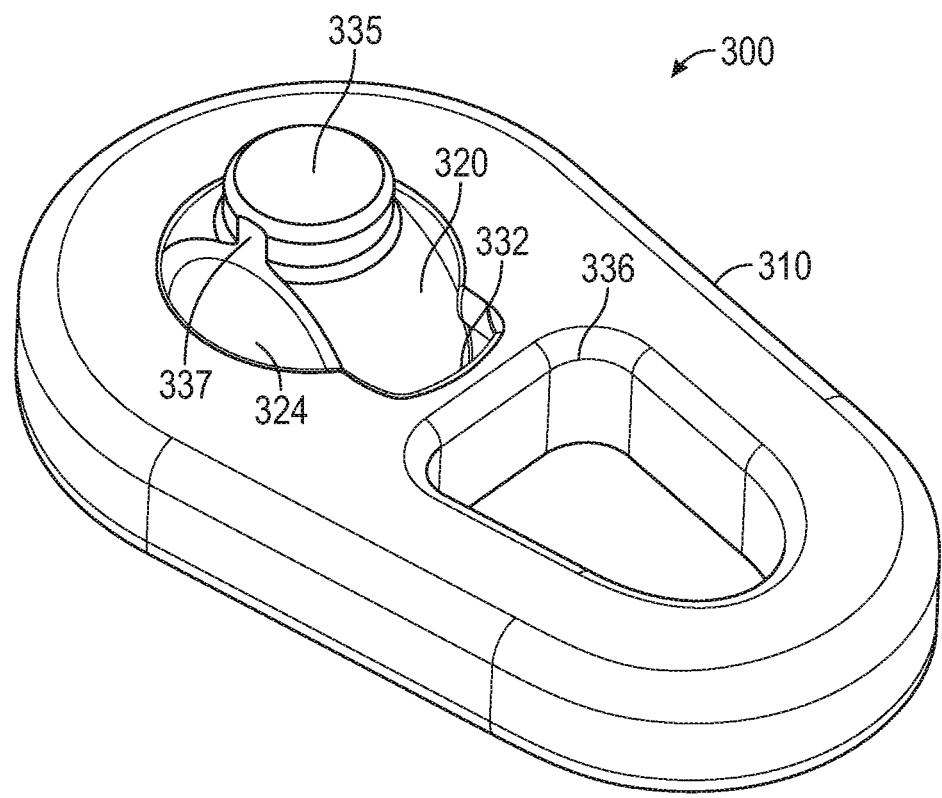
FIG. 18 is a perspective view of the link of FIG. 12 showing the swivel ball bushing being installed in the link body.

As best shown in FIGS. 12 and 18, the projection 335 of the swivel ball bushing 320 has a modified cylinder shape with opposing areas 337 having a reduced dimension. The opposing areas 337 of reduced dimension may be configured as flat surfaces as shown that are joined to opposing curved surfaces (defining the diameter) to complete the cross section of the modified cylinder. The slot 332 is dimensioned to accommodate the projection 335 and to allow it to rotate therein. At the intersections of the slot 332 with opposite surfaces of the body 310, the slot 332 is dimensioned to receive the reduced dimension areas of the projection 335 to thus allow the projection 335 to be installed into the slot 332. As best shown in FIG. 13, the slot 332 has opposing curved surfaces 339 that matingly receive cylindrical outer surfaces of the projection 335 and allow for relative rotation thereof.

Figure 14:
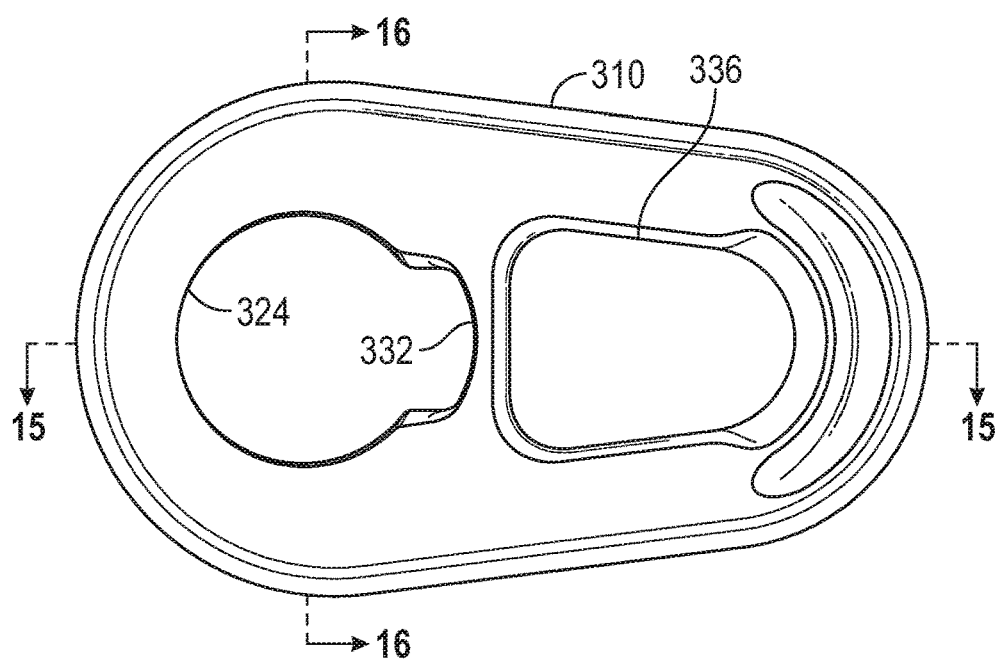
FIG. 14 is a top plan view of the link of FIG. 12 with the swivel ball bushing removed.
Figure 15:
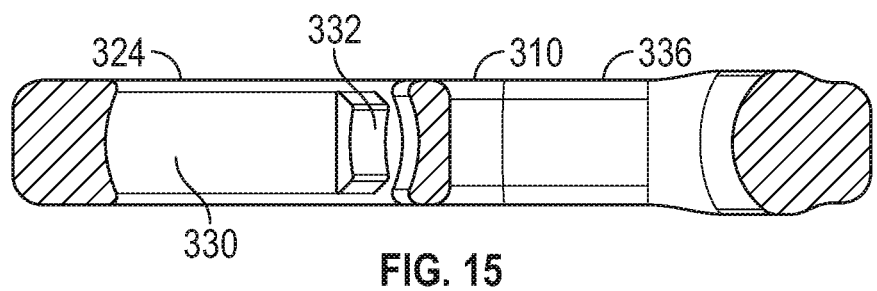
FIG. 15 is a longitudinal cross section of the link body in elevation taken at the line A-A in FIG. 14.
Figure 16:
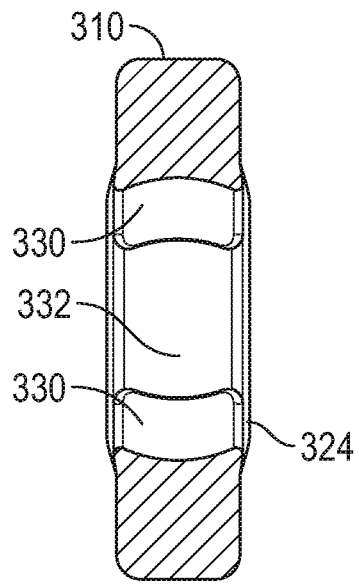
FIG. 16 is a transverse cross section of the link body taken at the line B-B in FIG. 14.
Figure 17:
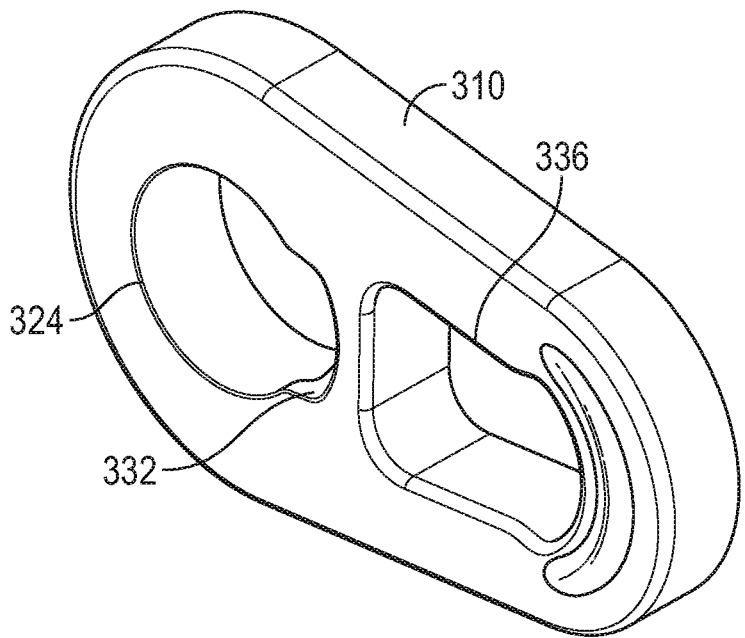
FIG. 17 is a perspective view of the link body of FIG. 14.

FIG. 14 is a plan view of the body 310, and FIGS. 15 and 16 are section views of the body taken at the lines A-A and B-B of FIG. 14, respectively. FIG. 17 is another perspective view of the body 310.

Figure 19:
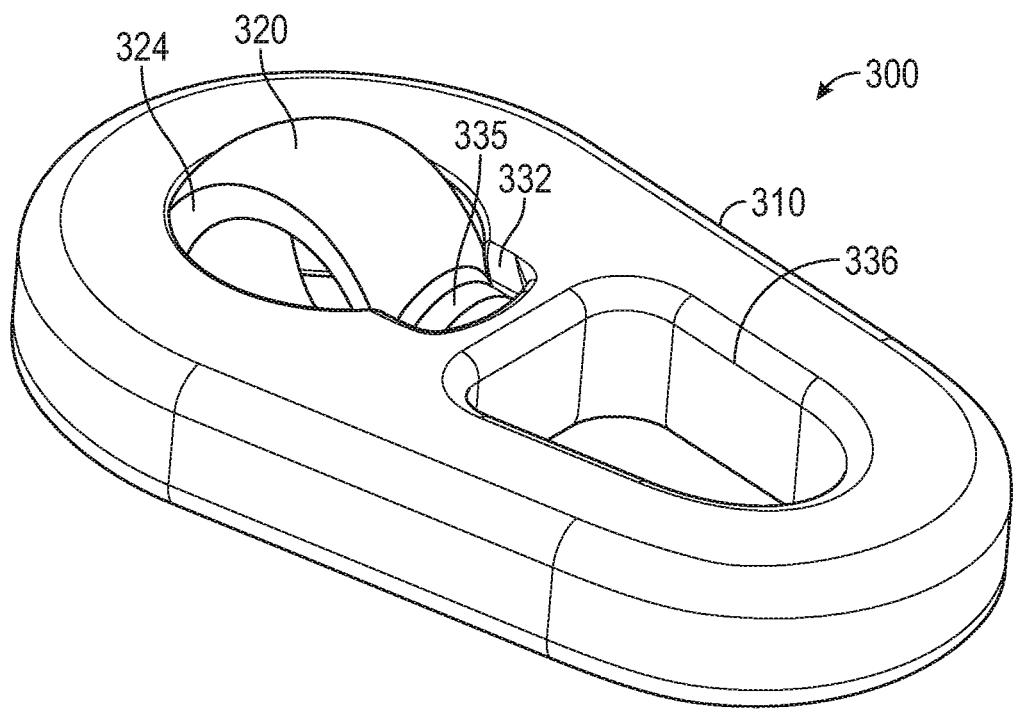
FIG. 19 is a perspective view of the link of FIG. 12 showing the swivel ball bushing installed and rotated to a different position.

FIGS. 18 and 19 are perspective views of the link 300 showing the swivel ball bushing 320 in the process of being installed in the body 310. In FIG. 18, the swivel ball bushing has been aligned with the slot 332 and inserted into the opening 324. In FIG. 19, the projection 335, which is facing upwards in FIG. 18, has been rotated about the lateral axis L (see FIG. 2) so that the projection 335 (with opposing areas 337 of reduced dimension aligned with the slot 332) can be received in the slot 332 as shown.

Figure 22:
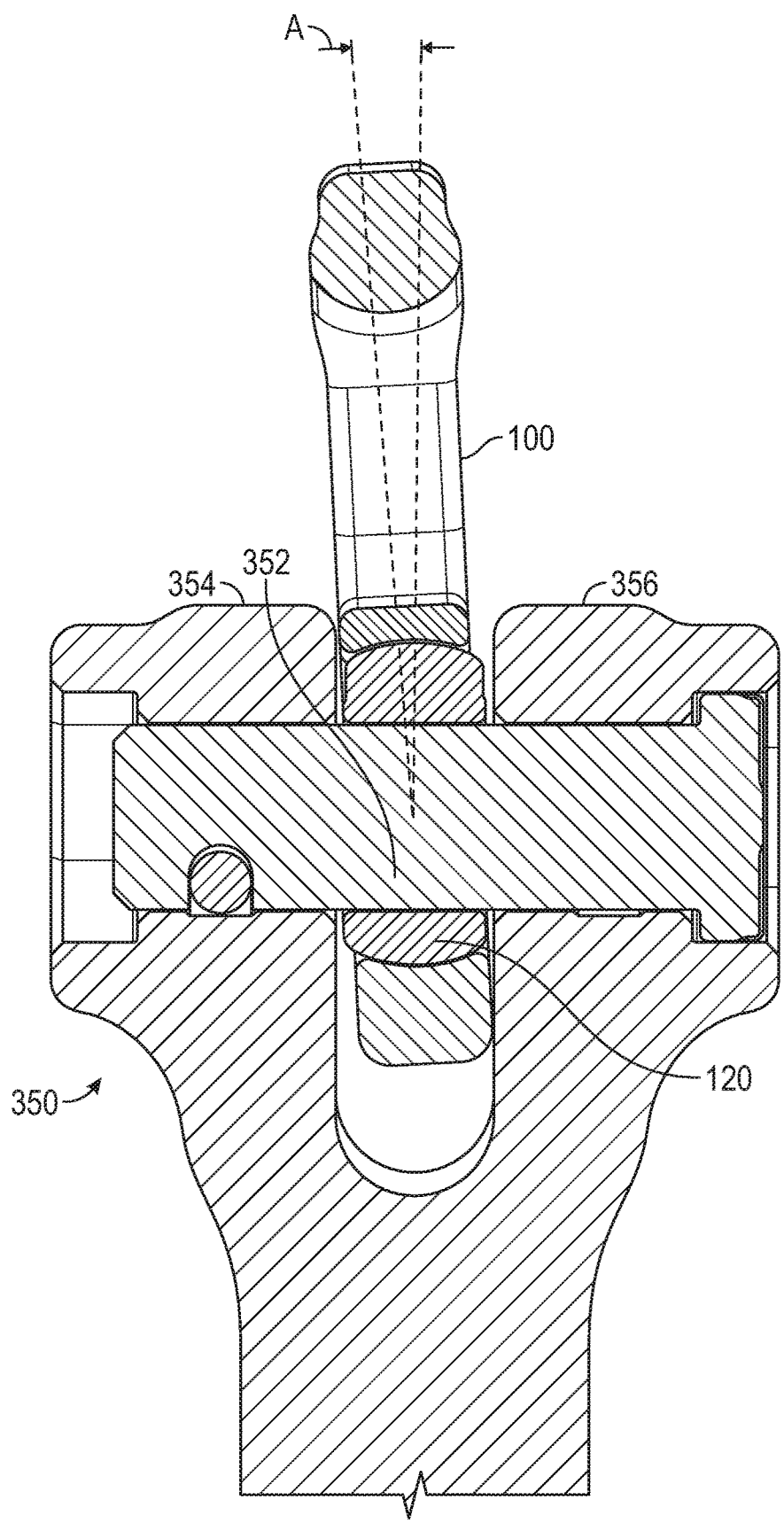
FIGS. 22-24 are sectioned views of a trunnion coupled by a pin to a link according to various described implementations.
Figure 23:
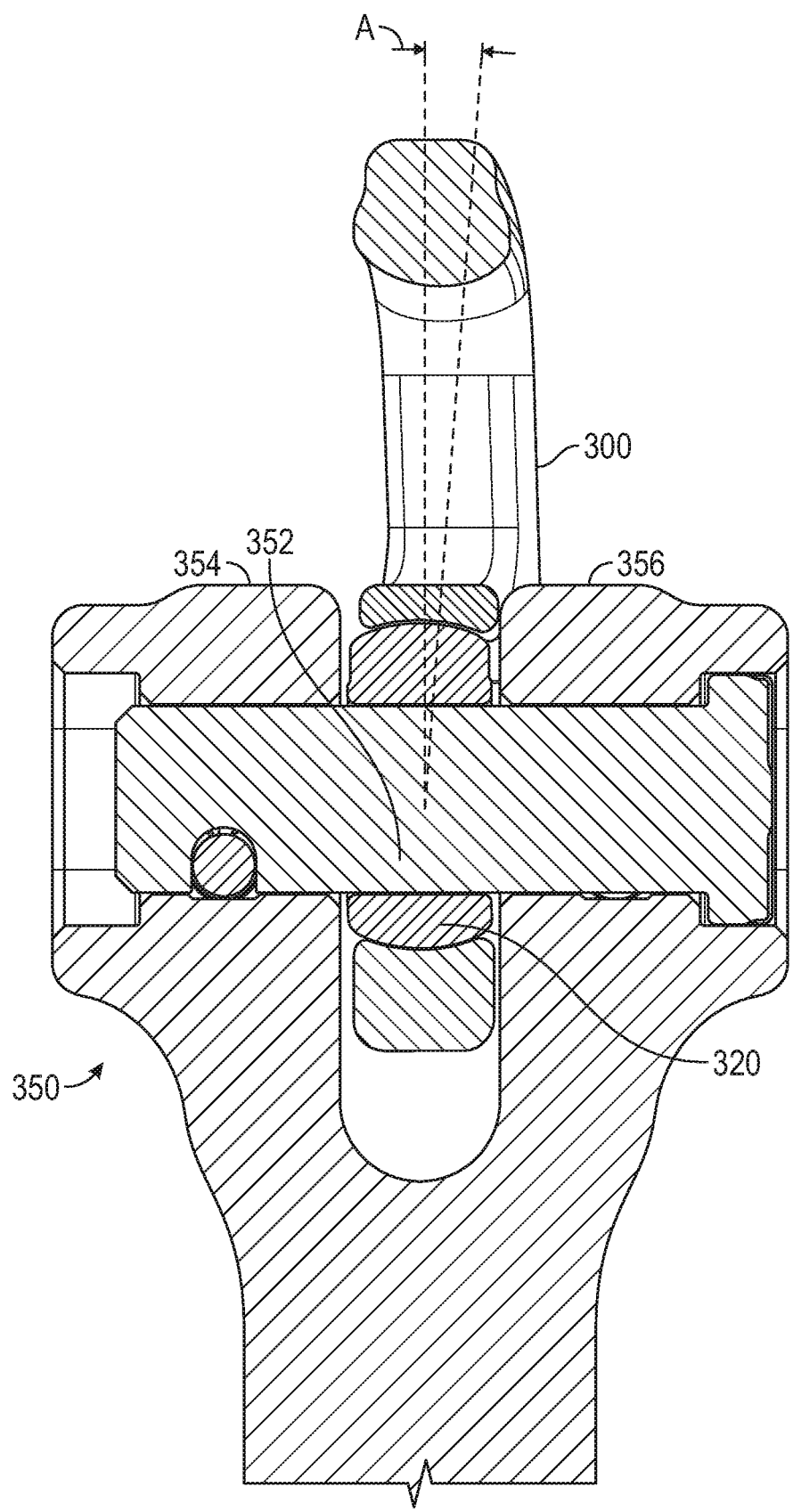
Figure 24:
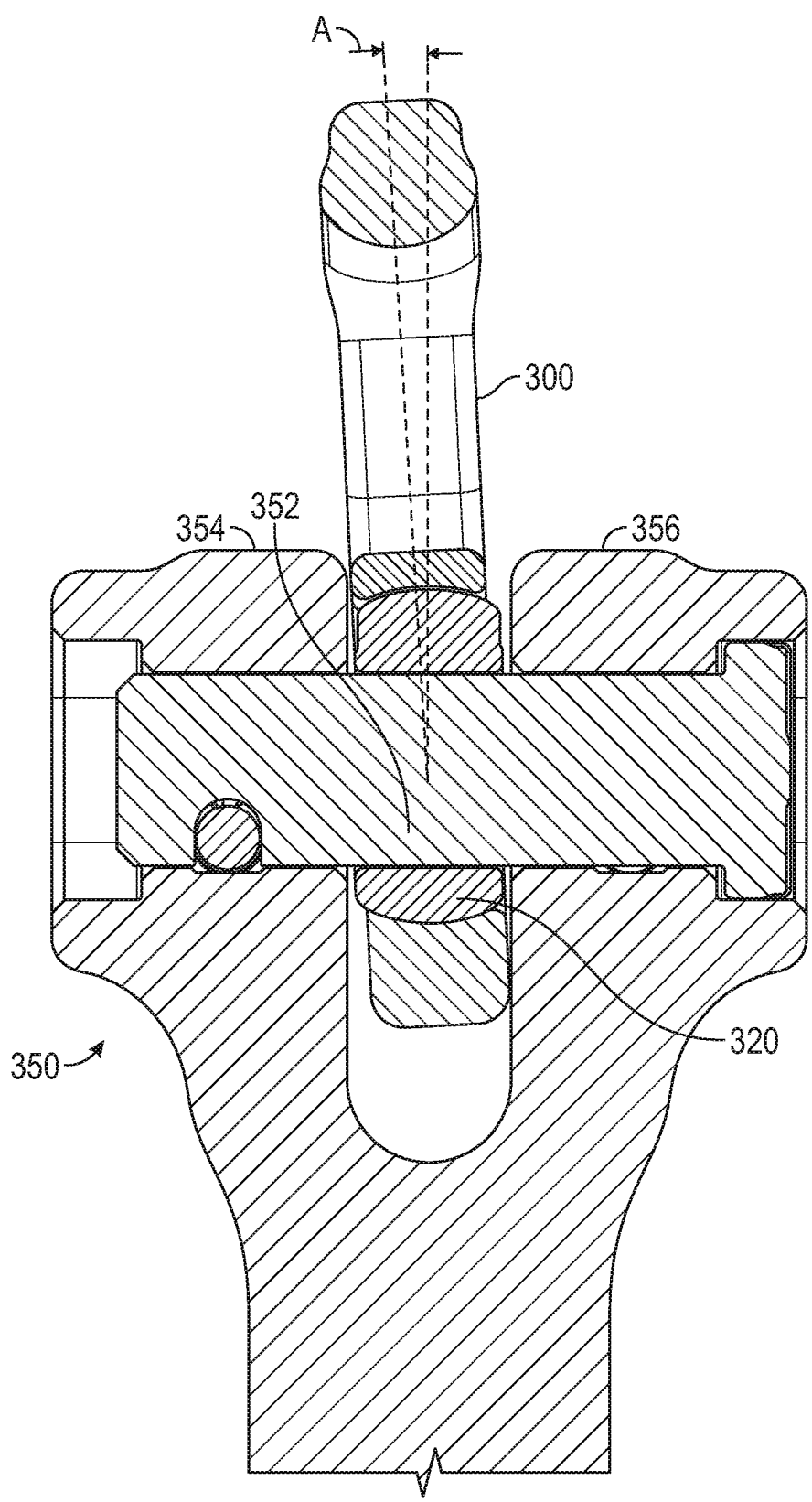

Referring to FIGS. 22-24, end links and/or swivel ball bushing arrangements as described above are shown as used with a trunnion link, which is one exemplary application. In FIG. 22, the end link 100 is shown connected to a trunnion 350. Specifically, the main body 110 of the end link 100 is shown attached to the trunnion 350 by its mating pin 352 that extends between bracket legs 354, 356, each of which seats a bushing. The end link 100 is located between the bracket legs 354, 356 and captured in place by the mating pin 352, which extends through the pin bore 131 of the swivel ball bushing 120. Due to the truncated spherical connection between the swivel ball bushing 120 and the main body 110, the main body is able to pivot or swing in the perpendicular direction a distance, preferably up to 10 degrees on each side of vertical, for a total pivot angle or swing angle A of up to about 20 degrees. Notably, the pin 352 and swivel ball bushing 120 mounted thereto remain fixed, and the main body of the end chain link pivots or swings relative thereto to accommodate off axis loading.

FIGS. 23 and 24 are similar to FIG. 22, except that the end link 300 is connected to the trunnion 350, and it is shown rotated in both right and left directions relative to the trunnion 350. Specifically, the main body 310 of the end link 300 is shown attached to the trunnion 350 by its mating pin 352 that extends between bracket legs 354, 356, each of which seats a bushing. As described, the end link 300 is located between the bracket legs 354, 356 and captured in place by the mating pin 352, which extends through the pin bore 331 of the swivel ball bushing 320. Due to the truncated spherical connection between the swivel ball bushing 320 and the main body 310, the main body is able to pivot or swing in the perpendicular direction a distance, preferably up to 10 degrees on each side of vertical, for a total pivot angle or swing angle A of up to about 20 degrees. As described, the pin 352 and swivel ball bushing 320 mounted thereto remain fixed, and the main body of the end chain link pivots or swings relative thereto to accommodate off axis loading.

Figure 25:
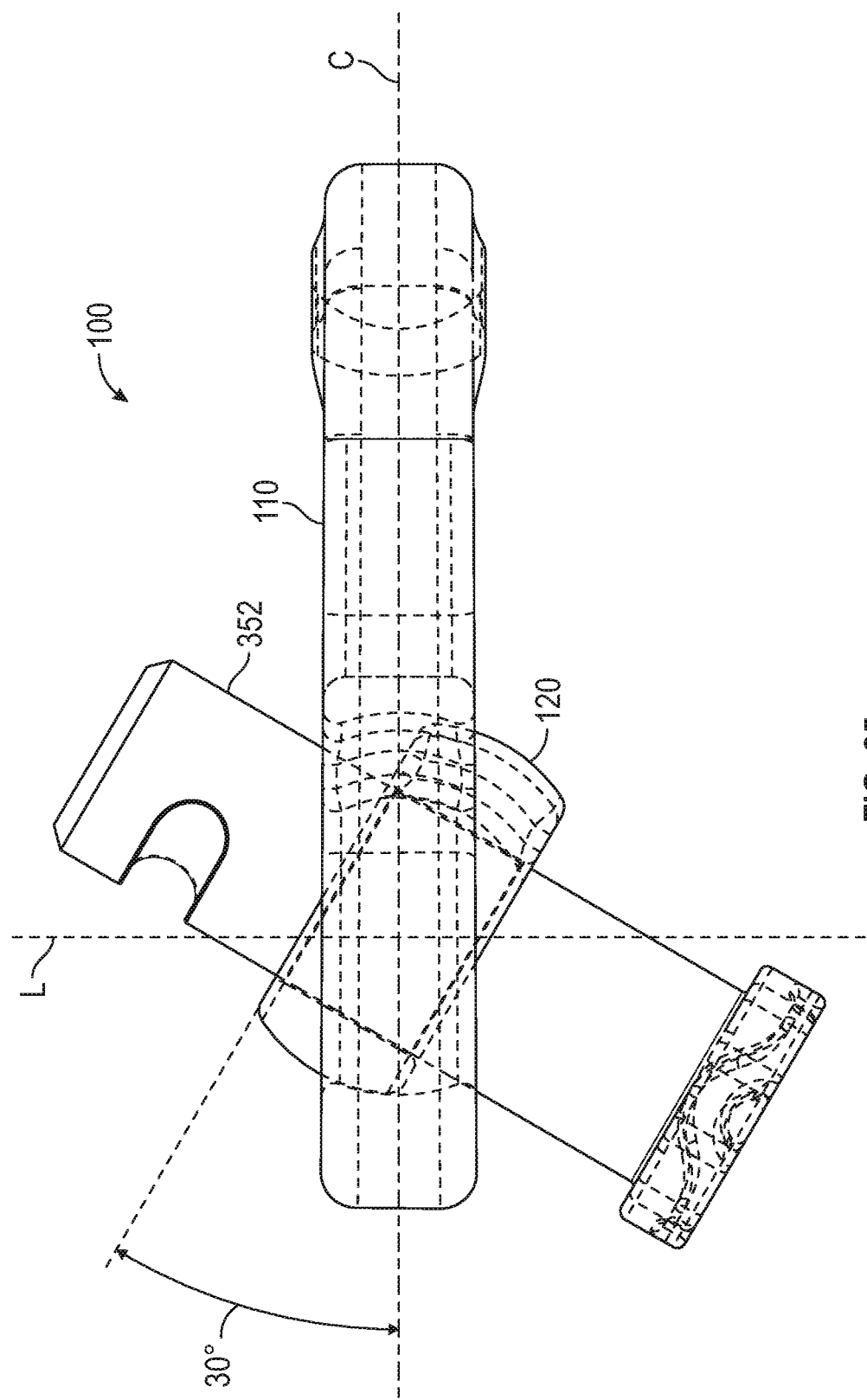
FIG. 25 is a plan view of the swivel ball bushing with a received pin rotated or tilted out of plane to a maximum angle according to some implementations.

FIG. 25 is a sectioned plan view of the end link 100 with the pin 352 received in the pin bore. The end link 100 is shown in isolation (i.e., without connection(s) to other components) and with the swivel ball bushing 120 rotated to a maximum extent (i.e., until the pin 352 contacts the body 110). For the illustrated configuration, which is representative, the maximum angle of rotation of the swivel ball bushing 120 relative to the body 110 about the lateral axis L in either direction is 30 degrees with the pin 352 received in the pin bore. The end link 300 and swivel ball bushing 320 with a received pin would similarly have a maximum angle of rotation of 30 degrees based on their illustrated configuration. It should be noted that a smaller diameter pin bore and correspondingly smaller diameter pin would provide for a greater maximum angle of rotation about the lateral axis L. Other changes to the configuration could be made to provide for a greater or lesser angle of rotation as may be required for specific applications.

In many applications, interference between the end link and connected components (see, e.g., FIGS. 23-24) effectively limits rotation to a range less than the maximum angle or rotation. Also, for the sake of completeness, it is noted that the maximum angle of rotation is defined for a swivel ball bushing with a received pin, whereas the swivel ball bushing without a received pin is capable of even greater rotation relative to the body about the lateral axis.

EXAMPLES

Figure 20:
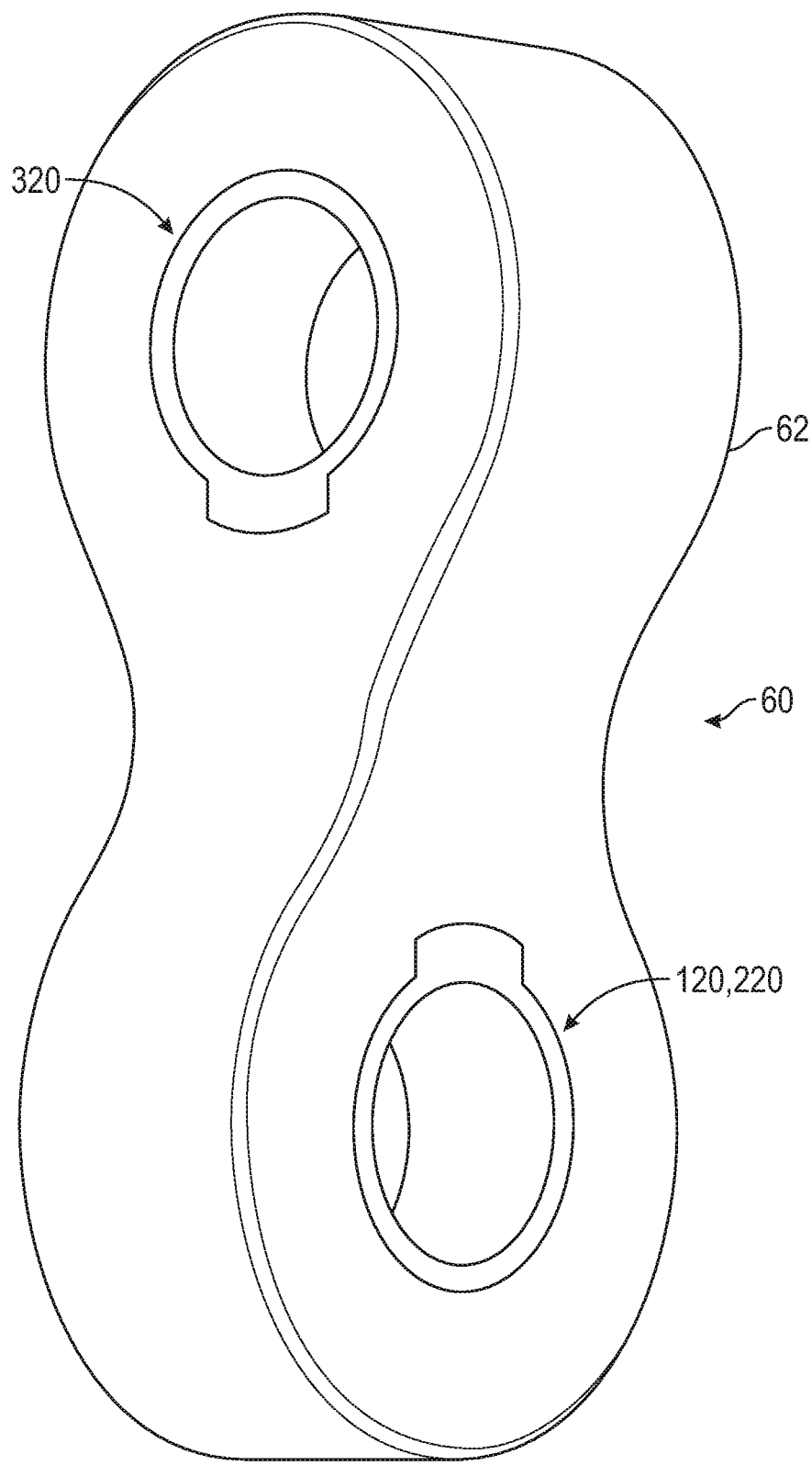
FIG. 20 is a perspective view of a swivel link that includes one or more swivel ball bushing(s) according to the described implementations.

FIG. 20 is a perspective view of another exemplary component, such as the swivel link 60, having a main body 62 and swivel ball bushings fitted at both ends of the link 60. For the sake of illustration, one end of the swivel link 60 is fitted with the swivel ball bushing 120 or 220, and the other end of the swivel link 60 is fitted with the swivel ball bushing 320. It is of course possible to provide a swivel ball bushing at only one end of the link.

Figure 21:
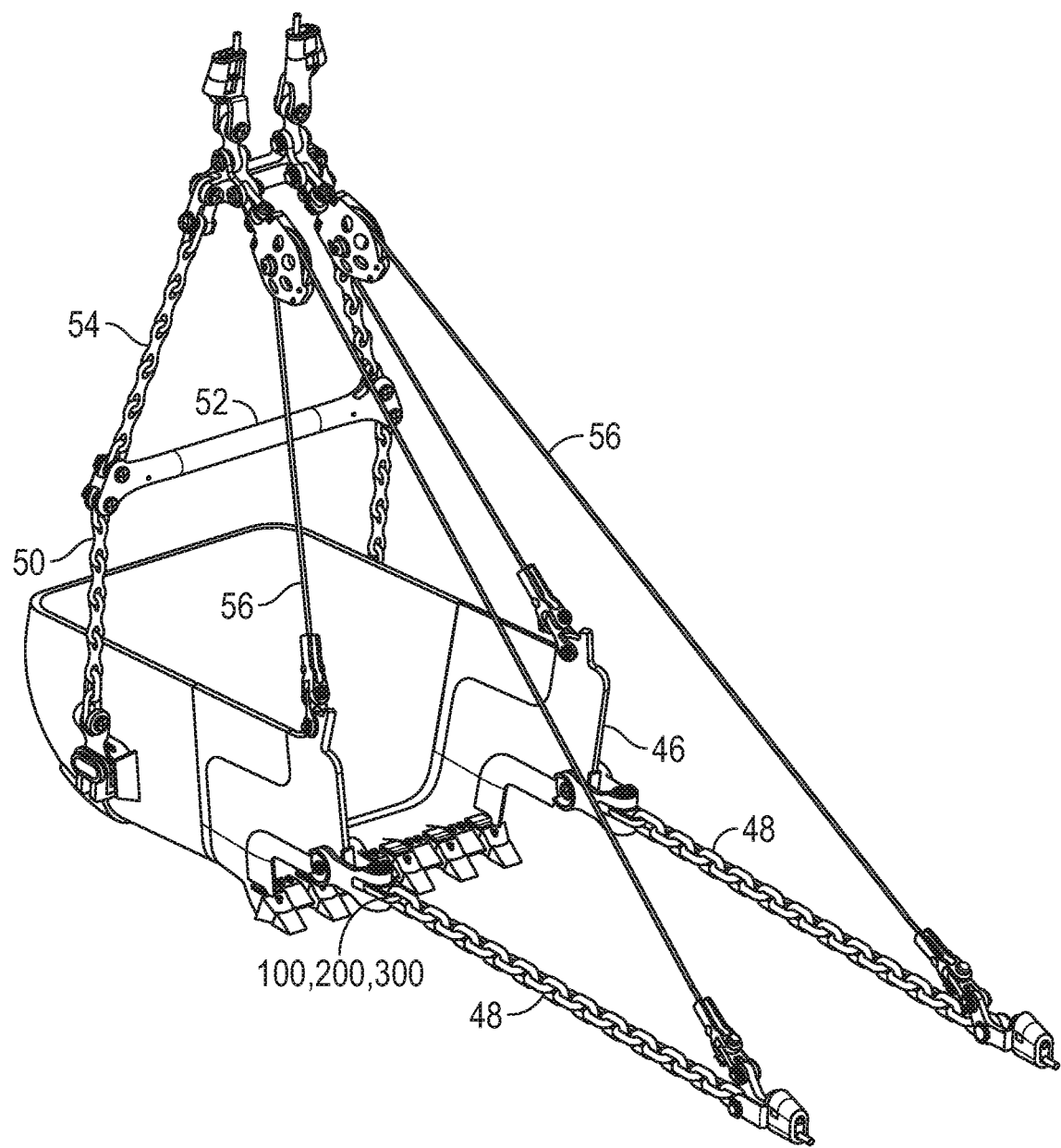
FIG. 21 is a perspective view of dragline equipment showing representative applications for rigging components having one or more swivel ball bushings according to the described implementations.

FIG. 21 is a perspective view of a dragline bucket 46, pair of dragline chains 48, pair of lower hoist chains 50, spreader bar 52, pair of upper hoist chains 54, and hoist rope rigging 56, which are interconnected to form a dragline. The described end link is well suited for connecting chains to various rigging components as, for example, connecting dragline chains to the bucket, upper and lower hoist chains to the spreader bar, and upper hoist chains to the hoist rope rigging. As examples only, the dragline chains 48 are shown connected to the dragline bucket 46 with a swivel ball bushing connection such as is provided by the end link 100, the swivel ball bushing arrangement 200 or the end link 300.

General Considerations

The end link 100 or 300 or the swivel ball bushing arrangement 200 is used in coupling or attaching a variety of rigging components to one another, such as hitch extensions, spreader bars, upper/lower hoist chains, drag rope sockets, bucket hitches and the like. The end link generally would not be used as a regular intermediary link in a drag chain or other chain.

The main body, the swivel ball bushing and the race may be made of a variety of materials suitable for chains and chain links used in draglines and heavy equipment environments including but not limited to high strength low alloy steel (HSLA). As one example, the swivel ball bushing may be made of manganese steel. The dimensions of the end link and swivel ball may vary widely in the context of draglines and heavy equipment, high load use. By way of example only, one embodiment of the swivel ball bushing may have an outer diameter up to about 18 inches, an inner diameter (pin bore) up to about 12.25 inches and a length up to about 16 inches.

It will be appreciated that the main body and link opening can take many different forms and shapes. For example, in some embodiments the body can have converging or parallel sides. If the sides converge toward one another, the link opening can be located on the wide end or narrow end of the main body, with the swivel ball bushing located on the other end. The link opening preferably is rounded at its distal end and straight at its opposed proximal end (proximate the central area of the main body) as shown, e.g., in FIG. 3, but the link opening also can be rounded at both ends.

By way of further example, the main body typically has a length of 10 inches to 46 inches (including 12 to 38 inches), a width at its widest point of 3 to 14 inches (including 4 to 12 inches), and a thickness of 1.5 inches to 9 inches (including 3 to 7 inches).

By way of example, the pin bore of the swivel ball typically has a diameter of 2 inches to 10 inches, such as 3 to 8 inches. The thickness of the swivel ball bushing typically is slightly greater than the thickness of the main body.

In using the terms "end link" and "stud end link" herein, such terms are intended to encompass swivel links as shown in FIG. 13, hoist links, sockets and like components.

In view of the many possible embodiments to which the disclosed principles may be applied, it should be recognized that the illustrated embodiments are only preferred examples and should not be taken as limiting in scope. Rather, the scope of protection is defined by the following claims. We therefore claim all that comes within the scope and spirit of these claims.

We claim:

1. An end link for use with heavy equipment, comprising:
a body having first and second openings, the body having a longitudinal axis and defining a main body plane that includes the longitudinal axis, the first opening having a slot located on a side thereof proximate the second opening and a truncated substantially spherical inner surface,
a lateral axis extending laterally through the body in the main body plane and intersecting the longitudinal axis at an intersection within the first opening, and a perpendicular axis extending from the intersection perpendicular to the longitudinal and lateral axes; and
a swivel ball bushing seated within the first opening, the swivel ball bushing having a truncated substantially spherical outer surface in nesting engagement with the inner surface of the body and a projection at one end seated in the slot, wherein engagement between the projection and slot prevents the swivel ball bushing from rotating relative to the body about the perpendicular axis,
wherein the slot and the projection seated in the slot are symmetrical relative to the main body plane and a perpendicular plane perpendicular to the main body plane that includes the perpendicular axis, and wherein the projection and the slot are shaped to prevent rotation of the swivel ball bushing relative to the body about the longitudinal axis and to allow rotation of the swivel ball bushing relative to the body about at least the lateral axis in two opposing directions, and wherein a range of rotation in each of the opposing directions includes a position of the swivel ball bushing rotated out of alignment with the body.

2. The end link of claim 1, wherein the projection has an opposing pair of exterior surfaces and the slot has an opposing pair of interior surfaces, and wherein engagement between the opposing pair of exterior surfaces and the opposing pair of interior surfaces, respectively, prevents rotation of the swivel ball bushing about the longitudinal axis.

3. The end link of claim 1, wherein the swivel ball bushing is free to pivot in the two opposing directions about the lateral axis through a range of 0 to 5 degrees in each of the opposing directions.

4. The end link of claim 1, wherein the swivel ball bushing is free to pivot in the two opposing directions about the lateral axis through a range of 0 to 10 degrees in each of the opposing directions.

5. The end link of claim 1, wherein the swivel ball bushing is free to pivot in the two opposing directions about the lateral axis through a range of 0 to 15 degrees in each of the opposing directions.

6. The end link of claim 1, wherein the swivel ball bushing has a thickness and the slot has a width dimension greater than the thickness, such that the swivel ball bushing may be oriented perpendicularly to the first opening and inserted into the first opening and slot.

7. The end link of claim 1, wherein the swivel ball bushing has a first wall thickness away from the projection and a second wall thickness proximate to the projection, the first wall thickness being greater than the second wall thickness.

8. The end link of claim 7, wherein the wall thickness of the swivel ball bushing tapers as the outer surface transitions from the first wall thickness to the second wall thickness.

9. The end link of claim 1, wherein the swivel ball bushing is substantially symmetric relative to the longitudinal axis and the lateral axis.

10. The end link of claim 1, wherein the swivel ball bushing has a cylindrical bore sized to receive a pin.

11. The end link of claim 1, wherein the projection has an end surface that is symmetrically curved in two directions.

12. An end link for use with heavy equipment, comprising:
a body having first and second openings, the body having a longitudinal axis and defining a main body plane that includes the longitudinal axis, the first opening having a slot located on a side thereof proximate the second opening and a truncated substantially spherical inner surface,
a lateral axis extending laterally through the body in the main body plane and intersecting the longitudinal axis at an intersection within the first opening, and a perpendicular axis extending from the intersection perpendicular to the longitudinal and lateral axes; and
a swivel ball bushing seated within the first opening, the swivel ball bushing having a truncated substantially spherical outer surface in nesting engagement with the inner surface of the body and a projection at one end seated in the slot, wherein engagement between the projection and slot prevents the swivel ball bushing from rotating relative to the body about the perpendicular axis,
wherein the projection has a modified cylinder shape with an opposing pair of curved surfaces defining a diameter of the cylinder shape separated by an opposing pair of reduced diameter dimension planar surfaces having a reduced dimension less than the diameter, wherein the slot and the projection seated in the slot are symmetrical relative to the main body plane and a perpendicular plane perpendicular to the main body plane that includes the perpendicular axis,
wherein the engagement between the projection and the slot permits allows the swivel ball to be rotatable relative to the longitudinal axis in opposing directions and relative to the lateral axis in opposing directions, and
wherein a range of rotation in each of the opposing directions includes a position of the swivel ball bushing rotated out of alignment with the body.

13. The end link of claim 12, wherein a narrowest dimension of the slot is greater than the reduced dimension and less than the diameter.

14. The end link of claim 12, wherein the swivel ball bushing and main body are free to pivot relative to each other through a range of 0 to 10 degrees in each of the opposing directions about the lateral axis and through a range of 0 to at least 90 degrees in each of the opposing directions about the longitudinal axis.

15. The end link of claim 12, wherein the swivel ball bushing has a first wall thickness away from the projection and a second wall thickness proximate to the projection, the first wall thickness being greater than the second wall thickness.

16. The end link of claim 12, wherein the swivel ball bushing has a cylindrical bore sized to receive a pin.

17. A swivel ball bushing arrangement for use with rigging components for heavy equipment, comprising:
a race having an opening, a slot in the opening, an inner mating surface and an outer surface configured for coupling within an opening of rigging component; the race having a longitudinal axis and defining a main body plane that includes the longitudinal axis, a lateral axis extending laterally through the race in the main body plane and intersecting the longitudinal axis at an intersection within the opening, and a perpendicular axis extending from the intersection perpendicular to the longitudinal and lateral axes;
a swivel ball bushing seated within the opening of the race, the swivel ball bushing having a truncated substantially spherical outer surface in nesting engagement with the inner surface of the race and a projection at one end seated in the slot, wherein the engagement between the projection and slot prevents the swivel ball bushing from rotating relative to the race about the perpendicular axis,
wherein the slot and the projection seated in the slot are symmetrical relative to the main body plane and a perpendicular plane perpendicular to the main body plane that includes the perpendicular axis,
wherein the projection and slot are shaped to prevent rotation of the swivel ball bushing relative to the body about the longitudinal axis and to allow rotation of the swivel ball bushing relative to the race about at least the lateral axis in two opposing directions, and wherein a range of rotation in each of the opposing directions includes a position of the swivel ball bushing rotated out of alignment with the race.

18. The swivel ball bushing arrangement of claim 17, wherein the outer surface of the race is cylindrical.

19. The swivel ball bushing arrangement of claim 17, wherein the outer surface of the race can be coupled within the opening of the rigging component at a selected orientation such that the swivel ball bushing is free to rotate in opposite directions about the lateral axis relative to the race and the rigging component.

* * * * *